United States Patent
Smith (10) Patent No.: US 6,466,614 B1
(45) Date of Patent: Oct. 15, 2002

(54) METHOD AND APPARATUS FOR CLASSIFYING A BASEBAND SIGNAL

(75) Inventor: Brian K. Smith, North Richland Hills, TX (US)

(73) Assignee: Motorola, Inc., Schaumburg, IL (US)

(*) Notice: Subject to any disclaimer, the term of this patent is extended or adjusted under 35 U.S.C. 154(b) by 0 days.

(21) Appl. No.: 09/814,539

(22) Filed: Mar. 22, 2001

(51) Int. Cl.[7] .................................................. H04B 3/46
(52) U.S. Cl. ...................................... 375/224; 375/316
(58) Field of Search ................................. 375/224, 226, 375/227, 228, 316; 370/204; 329/316, 348; 332/108, 119, 151

(56) References Cited

U.S. PATENT DOCUMENTS

| | | | | |
|---|---|---|---|---|
| 4,352,193 A | * | 9/1982 | Acker | 327/100 |
| 4,885,757 A | | 12/1989 | Provence | 375/96 |
| 5,303,269 A | | 4/1994 | Altes | 375/78 |
| 5,561,665 A | * | 10/1996 | Matsuoka et al. | 370/206 |
| 5,651,030 A | | 7/1997 | Wong et al. | 375/316 |
| 5,832,038 A | | 11/1998 | Carsello | 375/316 |
| 6,198,779 B1 | * | 3/2001 | Taubenheim et al. | 375/286 |

* cited by examiner

Primary Examiner—Don N. Vo
(74) Attorney, Agent, or Firm—R. Louis Breeden (57) ABSTRACT

A processor (1104) receives a baseband signal including a plurality of symbols, and determines (1002) a maximum modulation level and a minimum modulation level in the baseband signal through a modified self-organizing map clustering technique. The processor initializes (1008) a plurality of clusters (700, 800) corresponding to the plurality of modulation levels, based upon the maximum and minimum modulation levels; and processes (1010), through a modified adaptive k-means clustering technique, a symbol value corresponding to each of the plurality of symbols by updating (1012) parameters maintained for a cluster of the plurality of clusters, the cluster having a cluster mean value within a modulation-specified distance from the symbol value. The processor calculates (1014) a plurality of statistical values from the parameters maintained for the plurality of clusters, and classifies (1016, 1018, 1020) the baseband signal, based upon the plurality of statistical values and the parameters.

20 Claims, 4 Drawing Sheets

METHOD AND APPARATUS FOR CLASSIFYING A BASEBAND SIGNAL

FIELD OF THE INVENTION

This invention relates in general to wireless communication systems, and more specifically to a method and apparatus for classifying a baseband signal.

BACKGROUND OF THE INVENTION

A wireless communication device must be able to scan for valid channels. The device must be able to determine the existence of and the quality of a multi-level signal in a quick and efficient manner. Prior-art wireless communication receivers have utilized a variety of correlation techniques in combination with histograms for classifying received signals.

The prior-art techniques have required an appreciable amount of memory and have tended occasionally to classify a signal falsely. What is needed is an improved method and apparatus for classifying a received signal. The method and apparatus preferably will require less memory than prior-art techniques, will be more easily adapted to other signal types and will be more resistant to falsing.

DETAILED DESCRIPTION OF THE DRAWINGS

In one embodiment in accordance with the present invention, a signal classifier is described herein for classifying a received signal transmitted in the well-known ReFLEX protocol using 2-level and 4-level FSK modulation. It will be appreciated that, alternatively, other protocols using other forms of modulation can be classified in accordance with the present invention. Other modulation types suitable for classification in accordance with the present invention include QAM, QPSK, and GMSK, to name a few. The present invention also is not limited to 2 and 4 levels of modulation, but can be applied to any number of levels of modulation.

In one ReFLEX embodiment, an FM demodulator circuit receives a signal and sends baseband samples to a Digital Signal Processor (DSP). The baseband samples have a phase and a signal level. The baseband samples preferably are processed in the DSP by a clustering signal classifier algorithm in accordance with the present invention to estimate the following signal properties:

1. Type (e.g., ReFLEX, noise)
2. Quality (e.g., bit error rate)
3. Number of Modulation Levels
4. Symbol Rate The clustering signal classifier algorithm uses concepts from neural networks to classify the signal. Among other things, the algorithm uses two types of clustering and a neural network. The clustering algorithms are a modified self organizing feature map (MSOM) clustering algorithm and a modified adaptive k-means clustering algorithm. The MSOM clustering algorithm trains clusters for the outer frequency deviations, and the modified adaptive k-means clustering algorithm adapts or fine tunes the clusters for the inner and outer frequency deviations. The neural network serves as a non-linear mapper to compensate for samples which fall outside the cluster radius as the variance of the input symbols increases.

Figures 1, 2, 3:
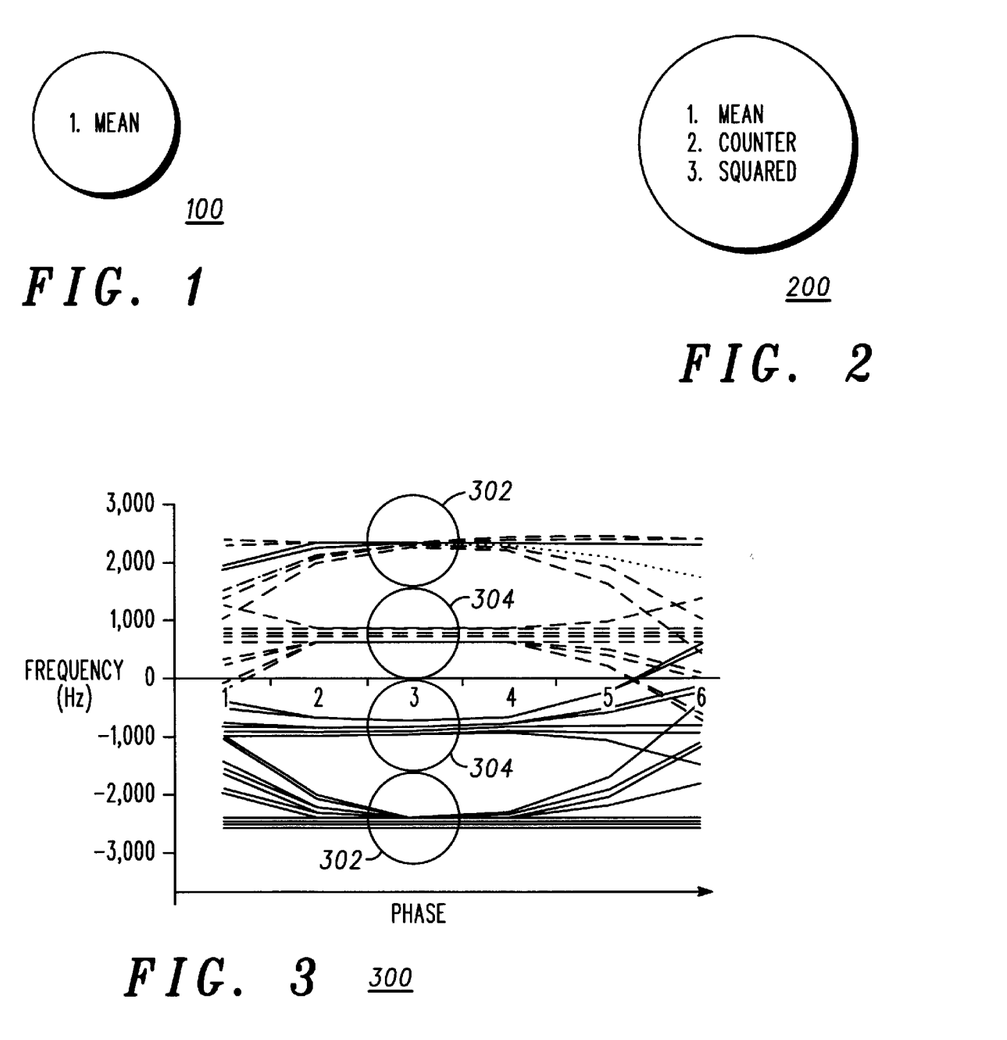
FIG. 1 is a diagram of an MSOM cluster in accordance with the present invention.
FIG. 2 is a diagram of an modified adaptive k-means cluster in accordance with the present invention.
FIG. 3 is a diagram depicting inner and outer k-means clusters at the maximum eye opening for a four-level FSK signal in accordance with the present invention.

FIG. 1 is a diagram of an MSOM cluster 100 in accordance with the present invention. The mean of the MSOM cluster 100 is trained to locate the outer frequency deviations, as will be explained further herein below.

FIG. 2 is a diagram of a modified adaptive k-means cluster 200 in accordance with the present invention. Note that in addition to a mean, the adaptive k-means cluster 200 keeps track of a counter and a squared component.

FIG. 3 is a diagram 300 depicting inner and outer k-means clusters at the maximum eye opening for a four-level FSK signal, in accordance with the present invention. Only the outer clusters 302 are utilized in the MSOM clustering algorithm, while both the inner clusters 304 and the outer clusters 302 are utilized in the adaptive k-means cluster algorithm.

Figure 4:
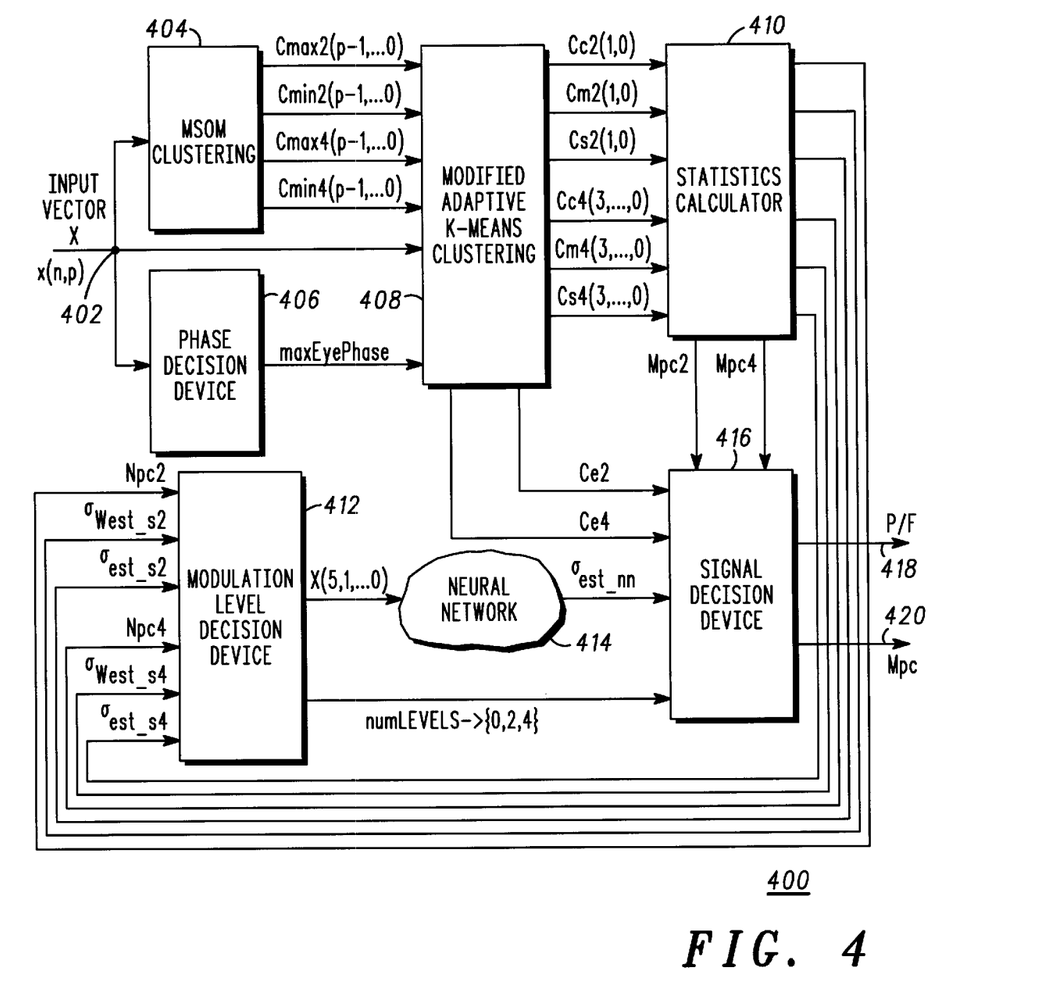
FIG. 4 is an electrical block diagram of an exemplary clustering signal classifier in accordance with the present invention.

FIG. 4 is an electrical block diagram of an exemplary clustering signal classifier 400 in accordance with the present invention. Briefly, the clustering signal classifier 400 comprises the following processes:

1. Cluster Training & Initialization (MSOM Clustering 404)

Figure 5:
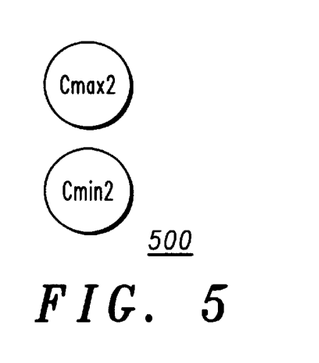
FIG. 5 depicts an MSOM phase cluster for two-level modulation in accordance with the present invention.
Figure 6:
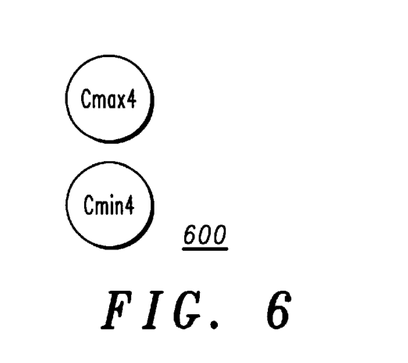
FIG. 6 depicts an MSOM phase cluster for four-level modulation in accordance with the present invention.

This process utilizes a modified SOM (MSOM) Clustering technique to train the mean values of the outer frequency deviation clusters. When the clustering signal classifier 400 is attempting to classify 2-level and 4-level FSK signals at the input 402, the MSOM Clustering process creates the phase clusters 500, 600 depicted in FIGS. 5 and 6, respectively. Note that the phase clusters 500, 600 contain a minimum cluster and maximum cluster. No inner clusters are used in this process, as the process is determining only the outer limits of the modulation.

2. Phase Decision Device 406

This process locates the center of the input symbols, i.e., the sample phase at the maximum eye opening.

3. Modified Adaptive k-Means Clustering 408

Figure 7:
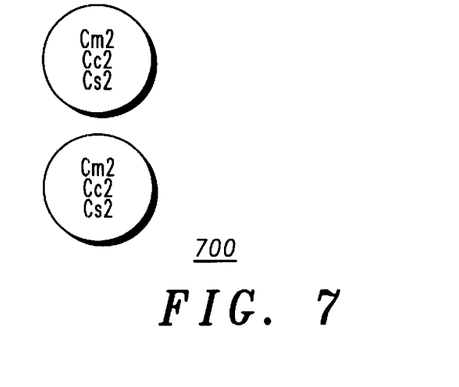
FIG. 7 depicts a phase cluster for two-level modulation in accordance with the present invention.
Figure 8:
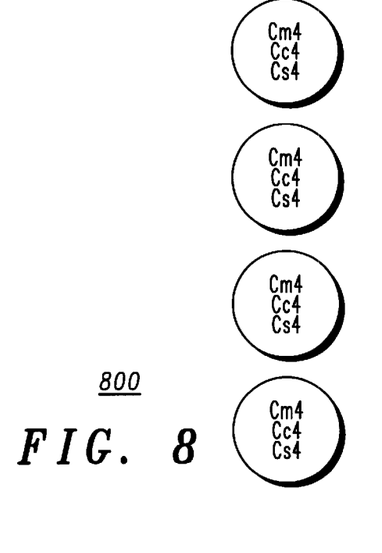
FIG. 8 depicts a phase cluster for four-level modulation in accordance with the present invention.

This process forms the inner frequency deviation clusters, based upon the minimum cluster and maximum cluster determined by the MSOM Clustering 404, and then fine tunes or adapts the mean values of both the inner and outer frequency deviation clusters. When the device is attempting to classify 2-level and 4-level FSK signals, the algorithm creates the phase clusters 700, 800, respectively, depicted in FIGS. 7 and 8. Note that each cluster within the phase clusters 700, 800 contains a mean, a counter, and a squared component.

4. Data Post Processing and Signal Evaluation

4a. Statistics Calculator 410

This process calculates statistical properties of the received signal. The statistical properties are used to help classify the signal.

4b. Modulation Level Decision Device 412

This process evaluates the signal statistics to determine the number of modulation levels.

4c. Neural Network Non-linear Mapper 414

This process is a multi-variable mapper to calculate the standard deviation of the input noise or symbols about the cluster means.

4d. Signal Decision Device 416

This process compares the statistical properties of the sampled signal to the statistical properties of a desired signal. It generates a pass/fail signal at a first output 418, and a phase cluster mean, which is an estimate of the frequency offset, at a second output 420.

Symbol Definitions

| | |
|---|---|
| $N_{phases}$ | number of phases per input symbol |
| $N_{symbols}$ | number of input symbols |
| $N_{levels}$ | number of FSK levels |
| $N_{basis}$ | number of basis functions |
| $N_{envelope}$ | number of envelope detection symbols |
| x(n, p) | signal level for the pth phase of the nth input symbol |
| Cr | cluster radius |
| BW | receive bandwidth of the device |
| Ceye(p) | phase delta squared value for the pth phase |
| $max_{EyePhase}$ | phase at the maximum eye opening |
| numLevels | number of FSK levels detected |
| w(i) | mapping weight from the ith input to the output |
| X(5, 4, ..., 0) | input basis vector to the Neural Network |
| $\sigma_{est\_nn}$ | the Neural Network estimate of the standard deviation about the symbol levels |

A phase cluster is defined as a set of clusters which are used to detect a specific number of modulation levels. The number of phase clusters may be calculated using the following equation: $\log_2 m_{max}$ where $m_{max}$ is the maximum number of modulation levels to detect. The number of clusters within the mth phase cluster may be calculated for the mth phase cluster using the following equation: $2^m$. For all of the following variables, the phase cluster index, m may index from 0 to $\log_2 m_{max}-1$ and the cluster index, k may index from 0 to $2^m-1$ for m=1 to $m_{max}$.

| | |
|---|---|
| Cmax(m, p) | cluster maximum for the pth phase of the mth phase cluster |
| Cmin(m, p) | cluster minimum for the pth phase of the mth phase cluster |
| Ce(m) | cluster edge counter for the mth phase cluster |
| Cc(m, k) | counter for the kth cluster of the mth phase cluster |
| Cm(m, k) | mean of the kth cluster of the mth phase cluster |
| Cs(m, k) | input squared accumulator for the kth cluster of the mth phase cluster |
| $\sigma_{est}(m, k)$ | estimate of the standard deviation about the kth cluster mean for the mth phase cluster |
| $\sigma_{West\_s}(m)$ | weighted estimate of the standard deviation about cluster means for the mth phase cluster |
| $\sigma_{est\_c}(m)$ | estimate of the standard deviation about the mth phase cluster mean |
| $N_{pc}(m)$ | total number of samples in the mth phase cluster |
| $M_{pc}(m)$ | estimate of the mean for the mth phase cluster |

Constants for Simulation/Results

| | |
|---|---|
| #define Nphases | 6; |
| #define Nenvelope | 100; |
| #define Nsymbols | 300; |
| #define Nbasis | 6; |
| #define Nlevels | 4; |
| #define BW | 19200; |
| #define sGain | ⅓; |
| #define eGain | ⅛; |
| #define CcInit | 1/eGain; |
| #define Cr | 800 |

MSOM Clustering 404

The MSOM Clustering algorithm detects the RF envelope of the input signal. The algorithm uses a linearly decreasing asymmetric cluster radius and gain to train the minimum, Cmin and maximum, Cmax cluster means for each phase. When a new sample falls within the cluster radius, the sample is used to adjust the cluster mean. The cluster gain decreases with time and the cluster radius decreases with time. As the variance of the input noise increases, the algorithm requires more samples to train the outer cluster means. The algorithm is able to locate the mean value of the outer deviations for wide deviation signals and for signals with large frequency offsets. When the outer frequency deviation clusters have been trained, then the inner frequency deviation clusters are created. Exemplary C-code for performing this process is presented below.

```
double gain = 0.0;
double CrH2 = 0.0, CrL2 = 0.0, CrH4 = 0.0, CrL4 = 0.0;
double Cmax2[Nphases], Cmin2[Nphases];
double Cmax4[Nphases], Cmin4[Nphases];
// Loop for the # of Phases
for (p = 0; p < Nphases; p++)
    {
    // Initialize Arrays
    Cmax2[p] = 0.0;
    Cmax4[p] = 0.0;
    Cmin2[p] = 0.0;
    Cmin4[p] = 0.0;
    }
// Loop for the # of RF Envelope Symbols
for (n = 0; n < Nenvelope; n++)
    {
    // Loop for the # of Phases
    for (p = 0; p < Nphases; p++)
        {
        // Linearly Decrease the Gain of the RF Envelope Detector
        gain = (sGain - eGain)*(1-n/Nenvelope) + eGain;
        // Linearly Decrease the Higher Range of the RF Envelope Max Cluster
        CrH2 = (BW/2-3*Cr)*(1-n/Nenvelope) + 3*Cr;
        // Linearly Increase the Lower Range of the RF Envelope Min Cluster
        CrL2 = 3*Cr*(n/Nenvelope);
        // Update the RF Envelope Min/Max Clusters
        if ((x[n][p] > (Cmax2[p] - CrL2)) && (x[n][p] < (Cmax2[p] + CrH2)))
            {
            Cmax2[p] = Cmax2[p] + (x[n][p] - Cmax2[p])*gain;
            }
        else if ((x[n][p] < (Cmin2[p] + CrL2)) && (x[n][p] > (Cmin2[p] - CrH2)))
```

```
            {
              Cmin2(p) = Cmin2[p] + (x[n][p] - Cmin2[p])*gain;
            }
        }
      // / Linearly Decrease the Higher Range of the RF Envelope Max
      Cluster
      CrH4 = (BW/2Cr)*(1-n/Nenvelope) + Cr;
      // / Linearly Increase the Lower Range of the RF Envelope Min
      Cluster
      CrL4 = Cr*(n/Nenvelope);
      // / Update the RF Envelope Min/Max Clusters
      if ((x[n][p] > (Cmax4[p] - CrL4)) && (x[n][p] < (Cmax4[p] +
      CrH4)))
        {
          Cmax4(p) = Cmax4[p] + (x[n][p] - Cmax4[p])*gain;
        }
      else if ((x[n][p] < (Cmin4[p] + CrL4)) && (x[n][p] >
      (Cmin4[p] - CrH4)))
        {
          Cmin4[p] = Cmin4[p] + (x[n][p] - Cmin4[p])*gain;
        }
    }
  }
}
// / ---- RF Envelope Detector: MSOM Clustering Post Processing --------
//
double Cm2[Nlevels/2], Cc2[Nlevels/2], Cs2[Nlevels/2];
double Cm4[Nlevels], Cc4[Nlevels], Cs4[Nlevels];
// / Initialize 2-Level Cluster Means
Cm2[1] = Cmax2[maxEyePhase];
Cm2[2] = Cmin2[maxEyePhase];
// / Initialize the 2-Level Cluster Squares and Counts
for (i = 0; i < Nlevels/2; i++)
  {
    Cc2[i] = CcInit;
    Cs2[i] = CcInit*Cm2[i]*Cm2[i];
  }
// / Initialize 4-Level Cluster Means
Cm4[1] = Cmax4[maxEyePhase];
Cm4[2] = Cmin4[maxEyePhase];
Cm4[3] = (Cm4[1]+Cm4[2])/2 + (Cm4[1]-Cm4[2])/6;
Cm4[4] = (Cm4[1]+Cm4[2])/2 - (Cm4[1]-Cm4[2])/6;
// Initialize 4-Level Cluster Squares and Counts
for (i = 0; i < Nlevels; i++)
Cc4[i] = CcInit;
Cs4[i] = CcInit*Cm4[i]*Cm4[i];
End
```

Phase Decision Device 406

The Phase Decision Device locates the maximum eye opening of the input symbols. The device accumulates the squared delta between samples at each phase. For the phase corresponding to the maximum eye opening, the accumulated squared delta is a maximum. Exemplary C-code for performing this process is presented below.

```
double Ceye[Nphases];
// / Initialize Array
for (p = 0; p < Nphases; p++)
  {
    Ceye[p] = 0.0;
  }
// / Loop for the # of RF Envelope Detection Symbols
for (n = 0; n < Nenvelope; n++)
  {
    // / Loop for the # of Phases
    for (p = 0; p < Nphases; p++)
      {
        // / Update the Symbol Squared Delta Statistic
        if(n > 1)
          {
            Ceye[p] += (x[n][p] - x[n-1][p])*(x[n][p] - x[n-1][p]);
          }
      }
```

```
    }
int maxEyePhase = 0;
double dmax = 0.0;
// / Locate the Max Eye Opening
for (p = 0; p < Nphases; p++)
  {
    if (Ceye[p] > dmax)
      {
        dmax = Ceye[p];
        maxEyePhase = p;
      }
  }
```

Modified Adaptive k-Means Clustering 408

The Modified Adaptive k-Means Clustering algorithm updates the cluster mean, counter and squared values. The minimum and maximum cluster means generated by the MSOM Clustering Algorithm provide a coarse estimate of the location of the inner and outer frequency deviation clusters. The Modified Adaptive k-Means Clustering Algorithm fine tunes the cluster means while accumulating the input squared which will be used in the post processing to estimate the standard deviation of the input noise of symbols about the cluster mean. As each input symbol at the maximum eye opening is processed the algorithm searches for the nearest cluster to update. When located the following calculations are performed:

1. The cluster counter is incremented.
2. The cluster mean is updated by using the input value and cluster counter.
3. The input is squared and then added to the cluster squared value.
4. The cluster number is compared to the last updated cluster number and if they are different the cluster edge counter is incremented else the cluster edge counter remains the same.
5. Repeat the sequence for both 2 and 4 level clustering.

Exemplary C-code for performing this process is presented below.

```
// / Modified Adaptive k-Means Clustering
//
// / Loop for the # of Symbols
for (n = 0; n < Nsymbols; n++)
  {
    // Locate 2-Level Cluster to Update
    int dminIndex = 0;
    double dmin = 3*Cr;
    double d = 0.0;
    for (j = 0; n < Nlevels/2; j++)
      {
        // / Calculate the Distance to Cluster Mean
        d = abs(x[n][maxEyePhase] - Cm2[j]);
        if (d < dmin)
          {
            // / Update Cluster Location
            dmin = d;
            dminIndex = j;
          }
      }
    if (dmin < 3*Cr)
      {
        // / Adapt Cluster
        Cm2[dminIndex] = Cm2[dminIndex] * Cc2[dminIndex];
        Cm2[dminIndex] = Cm2[dminIndex] + x[n][maxEyePhase];
        Cc2[dminIndex] = Cc2[dminIndex] + 1;
        Cm2[dminIndex] = Cm2[dminIndex] / Cc2[dminIndex];
```

```
        Cs2[dminIndex] = Cs2[dminIndex] + x[n][maxEyePhase] * x[n]
            [maxEyePhase];
        // Check for Edge
        if (Cptr2 != dminIndex)
            {
            Cptr2 = dminIndex;
            Ce2 = Ce2 + 1;
            }
        }
    }
    // Locate 4-Level Cluster to Update
    int dminIndex = 0;
    double dmin = Cr;
    double d = 0.0;
    for (j = 0; j < Nlevels; j++)
        {
        // Calculate the Distance to Cluster Mean
        d = abs(x[n][maxEyePhase] - Cm4[j]);
        if (d < dmin)
            {
            // Update Cluster Location
            dmin = d;
            dminIndex = j;
            }
        }
    if (dmin < Cr)
        {
        // Adapt Cluster
        Cm4[dminIndex] = Cm4[dminIndex] * Cc4[dminIndex];
        Cm4[dminIndex] = Cm4[dminIndex] + x[n][maxEyePhase];
        Cc4[dminIndex] = Cc4[dminIndex] + 1;
        Cm4[dminIndex] = Cm4[dminIndex] / Cc4[dminIndex];
        Cs4[dminIndex] = Cs4[dminIndex] + x[n][maxEyePhase] *
            x[n][maxEyePhase];
        // Check for Edge
        if (Cptr4 != dminIndex)
            {
            Cptr4 = dminIndex;
            Ce4 = Ce4 + 1;
            }
        }
    }
```

Statistics Calculator 410

The Statistics Calculator calculates the phase cluster count, the phase cluster mean, the input symbol or noise standard deviation about the cluster mean, the weighted input symbol or noise standard deviation about the cluster mean and the phase cluster standard deviation about the phase cluster mean.

Phase Cluster Count, $N_{pc}$

The sum of all samples contained within a phase cluster is used to weight the symbol standard deviation estimates. As the input symbol or noise standard deviation increases, the number of samples contained within the clusters decreases. Assuming the maximum number of FSK-levels to detect is 4(=$N_{levels}$), then the following equations calculate the 2 and 4 level phase cluster counts, respectively.

$$N_{pc2} = \sum_{m=1}^{Nlevels/2} Cc2(m)$$

$$N_{pc4} = \sum_{m=1}^{Nlevels} Cc4(m)$$

Input Symbol or Noise Standard Deviation Estimate, $\sigma_{est}(m)$

The estimate of the symbol or noise standard deviation may be calculated using the cluster mean, counter and squared values. Assuming the maximum number of FSK-levels to detect is 4(=$N_{levels}$), then the following equations calculate the 2 and 4 level input symbol or noise standard deviations about the cluster means, respectively.

$$\sigma_{est2}(m) = \sqrt{\frac{Cs2(m)}{Cc2(m)} - Cm2(m)^2} \text{ for } m = 1 \text{ to } N_{levels}/2$$

since $\sigma(m)^2 = E\{(x(m) - E\{x(m)\})^2\} = E\{x(m)^2\} - E\{x(m)\}^2$ where $E\{x(m)\} = Cm2(m)$ & $E\{(x(m))^2\} = \frac{Cs2(m)}{Cc2(m)}$ $$\sigma_{est4}(m) = \sqrt{\frac{Cs4(m)}{Cc4(m)} - Cm4(m)^2} \text{ for } m = 1 \text{ to } N_{levels}$$

since $\sigma(m)^2 = E\{(x(m) - E\{x(m)\})^2\} = E\{x(m)^2\} - E\{x(m)\}^2$ where $E\{x(m)\} = Cm4(m)$ & $E\{x(m)^2\} = \frac{Cs4(m)}{Cc4(m)}$ Weighted Input Symbol or Noise Standard Deviation Estimate, $\sigma_{west\_s}$ When formed, the clusters will contain samples from one of the input symbols. As more samples are added to the cluster the variance of the cluster's estimate of the input symbol or noise standard deviation decreases. The input symbol standard deviation of each cluster is weighted by the cluster count divided by the total phase cluster count. Assuming the maximum number of FSK-levels to detect is 4(=$N_{levels}$), then the following equations calculate the 2 and 4 level weighted input symbol or noise standard deviations, respectively.

$$\sigma_{West\_s2} = \frac{1}{Npc2} \sum_{m=1}^{Nlevels/2} Cc2(m) \cdot \sigma_{est2}(m)$$

$$\sigma_{West\_s4} = \frac{1}{Npc4} \sum_{m=1}^{Nlevels} Cc4(m) \cdot \sigma_{est4}(m)$$

Phase Cluster Mean, Mpc

An estimate of the frequency error may be obtained by averaging the cluster means. Assuming the maximum number of levels to detect is 4(=$N_{levels}$), then the following equations calculate the 2 and 4 level phase cluster mean which is equivalent to the frequency offset error.

$$Mpc2 = \frac{1}{N_{levels}/2} \sum_{m=1}^{Nlevels/2} Cm2(m)$$

$$Mpc4 = \frac{1}{N_{levels}} \sum_{m=1}^{Nlevels} Cm4(m)$$

Phase Cluster Standard Deviation Estimate, $\sigma_{est\_c}$

To notch out undesired multi-level FSK signals, the phase cluster standard deviation is calculated. The center of the phase cluster is calculated by summing the cluster means and dividing by the number of samples in the phase cluster. Each phase cluster should be centered about the frequency offset of the FSK signal. If the signal has no frequency error, then the center of the phase clusters will be 0 Hz. Assuming the maximum number of levels to detect is 4, then the following equations calculate the 2 and 4 level phase cluster standard deviation estimate.

$$\sigma_{est\_c2} = \sqrt{\frac{1}{Nlevels/2} \cdot \sum_{m=1}^{Nlevels/2} (Cm2(m) - Mpc2)^2}$$

$$\sigma_{est\_c4} = \sqrt{\frac{1}{Nlevels} \cdot \sum_{m=1}^{Nlevels} (Cm4(m) - Mpc4)^2}$$

ReFLEX Signal Decision Device

The purpose of the ReFLEX Signal Decision Device is to classify the signal as a ReFLEX type signal or noise. The device determines the number of FSK-levels in the signal when determined to be a ReFLEX signal. The following logic determines whether or not a valid ReFLEX signal has been sampled.

```
// Set 2-Level Signal Type Thresholds
S_c2 = sqrt(3*Cr*3*Cr);
S_c2_upper = S_c2 + 400;
S_c2_lower = S_c2 - 400;
// Set 4-Level Signal Type Thresholds
S_c4 = sqrt((3*Cr*3*Cr + Cr*Cr)/2);
S_c4_upper = S_c4 + 100;
S_c4_lower = S_c4 - 100;
if ((Sest_c2(m) > S_c2_lower) && (Sest_c2(m) < S_c2_upper))
    // 2-Level ReFLEX FSK
    numLevels = 2;
else if ((Sest_c4(m) > S_c4_lower) && (Sest_c4(m) <
S_c4_upper))
    // 4-Level ReFLEX FSK
    numLevels = 4;
else
    // Colored Noise
    numLevels = 0;
```

Neural Network Non-Linear Mapper

Figure 9:
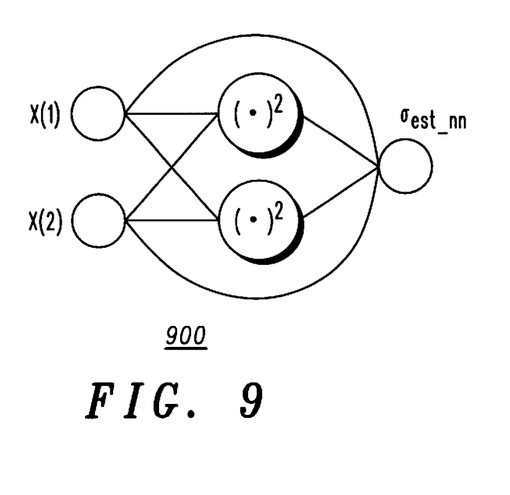
FIG. 9 is a block diagram of an exemplary non-linear mapper in accordance with the present invention.

FIG. 9 is a block diagram of an exemplary non-linear mapper 900 in accordance with the present invention. The non-linear mapper 900 comprises a neural network having one input, one hidden and one output layer. There are two input units, two hidden units and one output unit.

The neural network implements the following equation:

$$\sigma_{est\_nn} = w(0) + w(1) \cdot X(1) + w(2) \cdot X(2) + w(3) \cdot X(1)^2 + w(4) \cdot X(2)^2 + w(5) \cdot X(1) \cdot X(2)$$

where X(1)=Npc & X(2)=$\sigma_{wests}$

The hidden unit activation functions are squaring functions. The weights of the non-linear mapper are determined using a conjugate gradient algorithm to minimize the mean square error between the actual and desired non-linear mapper output.

The weights obtained from the conjugate gradient algorithm were the following;

w(0)=0.885856;
w(1)=2.898759;
w(2)=0.870999;
w(3)=0.000026;
w(4)=−1.901927;
w(5)=0.901174;

Signal Decision Device

The final step to determine whether or not the ReFLEX signal meets the remaining requirements for a desired signal. The following requirements are checked against the signal requirements:

Baud Rate(1600 or 3200 symbols/sec)

```
// Define the Baud Threshold between 1600 and 3200 Symbols/Sec for
2-Level FSK Signal
baud_threshold2 = ((Nsymbols-Nenvelope)*(.5+.5/2))/2; // (100+50)/2
// Define the Baud Threshold between 1600 and 3200 Symbols/Sec for
4-Level FSK Signal
baud_threshold4 = ((Nsymbols-Nenvelope)*(.75+.75/2)/2; // (150+75)/2
// Check for Valid 2 or 4-Level ReFLEX Baud Rate
baud = 0;
if (numLevels == 2)
    // Determine the Baud Rate using the 2-Level Edge Counter
    if (Ce2 < baud_threshold2)
        baud = 1600;
    else
        baud = 3200;
    end
else if (numLevels == 4)
    // Determine the Baud Rate using the 4-Level Edge Counter
    if (Ce4 < baud_threshold4)
        baud = 1600;
    else
        baud = 3200;
    end
else
    // Colored Noise
    baud = 0;
end
```

Quality (<1% BER)

```
// Define the Error Thresholds a1 1% BER
error_threshold4 = 330;
error_threshold2 = 3*error_threshold4;
// Check for Valid 2 or 4-Level ReFLEX Signal
pf2 = 0;
pf4 = 0;
if (numLevels == 2)
    // Calculate the P/F Result
    if (Sest_nn < error_threshold2)
        pf2 = 1;
    end
else if (numLevels == 4)
    // Calculate the P/F Result
    if (Sest_nn < error_threshold4)
        pf4 = 1;
    end
end
    // Colored Noise
    Sest_nn = 99999;
end
```

Figure 10:
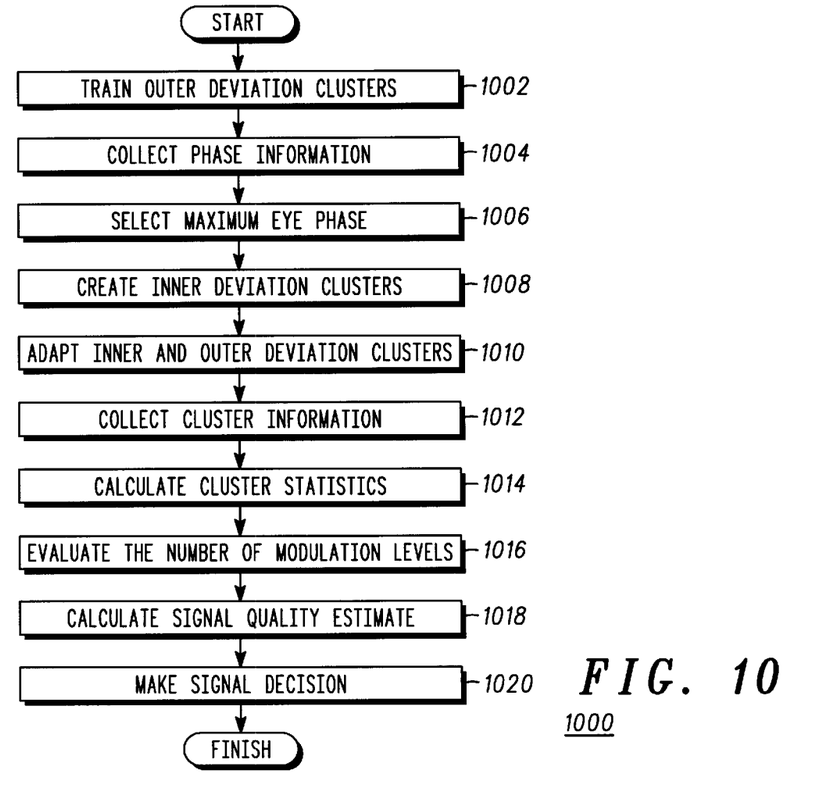
FIG. 10 is an exemplary flow diagram summarizing operation of the clustering signal classifier in accordance with the present invention.

FIG. 10 is an exemplary flow diagram 1000 summarizing operation of the clustering signal classifier 400 in accordance with the present invention after receiving a baseband signal. The flow starts by training 1002 the outer deviation clusters to determine a maximum modulation level and a minimum modulation level in the baseband signal through a modified self-organizing map (MSOM) clustering technique utilizing an asymmetric cluster radius. Next, phase information is collected 1004. From the phase information a sample phase corresponding to the maximum eye opening in the baseband signal is selected 1006. The inner deviation clusters are then created 1008, based upon the trained outer clusters. The inner and outer deviation clusters are adapted 1010, through a modified adaptive k-means clustering technique, to fine tune them. More specifically, a symbol value at the maximum eye sample phase corresponding to each of a plurality of symbols is processed by updating parameters maintained for one of the clusters, the cluster having a cluster mean value within a modulation-specified distance from the symbol value. At the same time, cluster information is collected 1012. The cluster information includes an accumulated sum of squares of input samples. From the cluster information, cluster statistics are calculated 1014. For example, the accumulated sum is used to calculate a standard deviation of the input samples about the cluster mean value. From the cluster statistics, the number of modulation levels is evaluated 1016. A signal quality estimate is also calculated 1018. From the signal quality, the symbol rate and the number of modulation levels, the baseband signal is classified and a pass/fail decision is made 1020.

The clustering signal classifier 400 in accordance with the present invention is highly RAM efficient compared with prior-art classifiers. For example, to detect a 4-level FSK signal using six sample phases, the clustering signal classifier 400 requires only 17.4 percent of the RAM required by a prior-art histogram algorithm using 31 bins representing 400 Hz frequency increments. In addition, the clustering signal classifier 400 resolves the frequency offset to +/−50 Hz for a 4-level FSK signal, and +/−200 Hz for a 2-level FSK signal. This compares with +/−400 Hz resolution of the prior-art histogram technique. The clustering signal classifier 400 also has a near-zero probability of falsing on an undesired signal. The old histogram approach can correlate to the wrong phase and falsely classify a signal.

Figure 11:
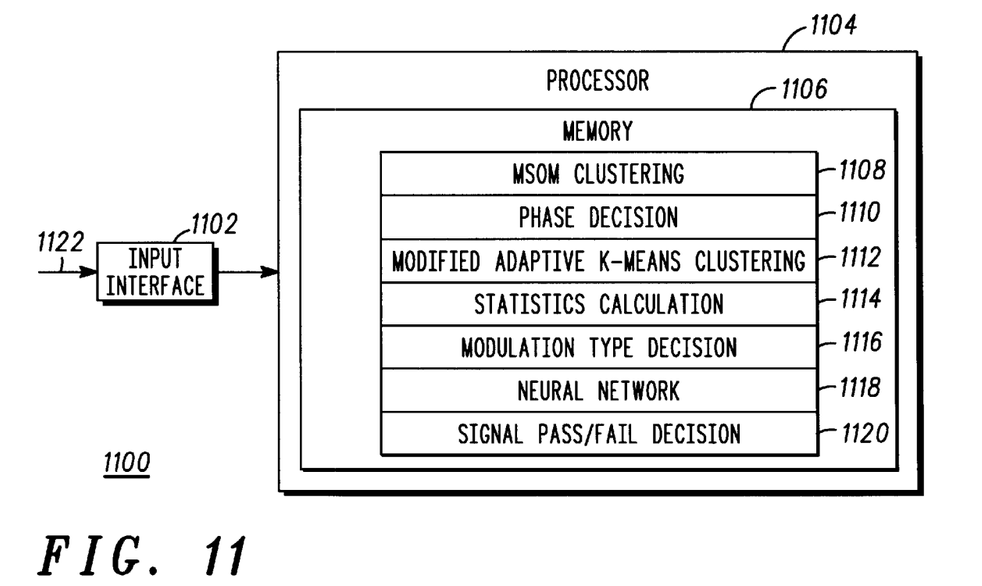
FIG. 11 is an electrical block diagram of an exemplary apparatus for classifying a baseband signal in accordance with the present invention.

FIG. 11 is an electrical block diagram of an exemplary apparatus 1100 for classifying a baseband signal 1122 as one of (a) noise and (b) a predetermined type of data signal comprising a plurality of symbols, each symbol represented by one of a plurality of modulation levels, in accordance with the present invention. The apparatus 1100 demonstrates how the functions of the clustering signal classifier 400 can be embodied in a conventional digital signal processor (DSP). The apparatus 1100 comprises a conventional input interface 1102 for receiving the baseband signal 1122. The input interface 1102 is coupled to a processor 1104, preferably a DSP, for processing the baseband signal 1122. It will be appreciated that, alternatively, the input interface 1102 can be an integral part of the processor 1104.

The processor 1106 includes a memory 1106 for programming the processor in accordance with the present invention. The memory 1106 comprises an MSOM Clustering program 1108 for programming the processor 1104 to determine a maximum modulation level and a minimum modulation level in the baseband signal through a modified self-organizing map (MSOM) clustering technique. The MSOM Clustering technique preferably utilizes an asymmetric cluster radius to determine the maximum and minimum modulation levels. The asymmetric radius is decreased over time during the training process. This advantageously allows the clusters to rapidly grow outward to the edges of the signal.

The memory 1106 further comprises a phase decision program 1110 for programming the processor 1104 to locate a maximum eye sample phase corresponding to a maximum eye opening in the baseband signal, and to process only the symbol value corresponding to the maximum eye sample phase during a modified adaptive k-means clustering process. The memory 1106 also includes a modified adaptive k-means clustering program 1112 for programming the processor 1104 to initialize a plurality of clusters corresponding to the plurality of modulation levels, based upon the maximum and minimum modulation levels. The adaptive k-means clustering program 1112 also programs the processor 1104 to process, through a modified adaptive k-means clustering technique, a symbol value corresponding to each of the plurality of symbols by updating parameters maintained for a cluster of the plurality of clusters, the cluster having a cluster mean value within a modulation-specified distance from the symbol value. In addition to the cluster mean, the parameters include an accumulated sum of squares of input samples and a count of the symbol values falling within the cluster. The parameters further include a count of transitions occurring among the plurality of clusters during a predetermined period, the count providing a measure of symbol rate. In addition, the memory 1106 includes a statistics calculation program 1114 for programming the processor 1104 to calculate a plurality of statistical values from the parameters maintained for the plurality of clusters. The statistical values include, among other things, a standard deviation of the input samples about the cluster mean value, the standard deviation providing a measure of signal quality.

Preferably, the predetermined type of data signal can utilize during a first period a first modulation type having a first number of modulation levels (e.g., 2-levels) and can utilize during a second period a second modulation type having a second number of modulation levels (e.g., 4-levels), the second number different from the first number. The steps of determining the maximum and minimum modulation levels, initializing the plurality of clusters, processing the symbol value, calculating the plurality of statistical values, and classifying the baseband signal preferably are performed substantially in parallel for both the first and second modulation types.

The statistics calculation program 1114 further programs the processor 1104 to calculate a first average of the cluster mean values for all clusters of the first modulation type, and to calculate a second average of the cluster mean values for all clusters of the second modulation type, the first and second averages providing a measure of a frequency offset for the first and second modulation types, respectively. In addition, the statistics calculation program 1114 programs the processor 1104 to calculate, for the clusters of the first modulation type, a first standard deviation of the clusters about the corresponding phase cluster mean, and to calculate, for the clusters of the second modulation type, a second standard deviation of the clusters about the corresponding phase cluster mean, the first and second standard deviations providing a measure indicative of which one of the first and second modulation types is currently utilized. The statistics calculation program 1114 also programs the processor 1104 to calculate a first total number of samples in all clusters of the first modulation type, and to calculate a second total number of samples in all clusters of the second modulation type, and to pass the first and second total numbers of samples to a non-linear mapper to correct for a non-linearity of a measure of signal quality.

The memory 1106 further comprises a modulation type decision program 1116 for programming the processor 1104 to decide whether the baseband signal is a first modulation type having a first number of levels, a second modulation type having a second number of levels, or noise. The memory 1106 also includes a neural network program 1118 for programming the processor 1104 to perform the non-linear mapping. In addition, the memory 1106 includes a signal pass/fail decision program for programming the processor 1104 to classify the baseband signal as passing or failing, based upon a symbol rate, a modulation type, and a signal quality, as determined from the plurality of statistical values and cluster edge count parameters.

Figure 12:
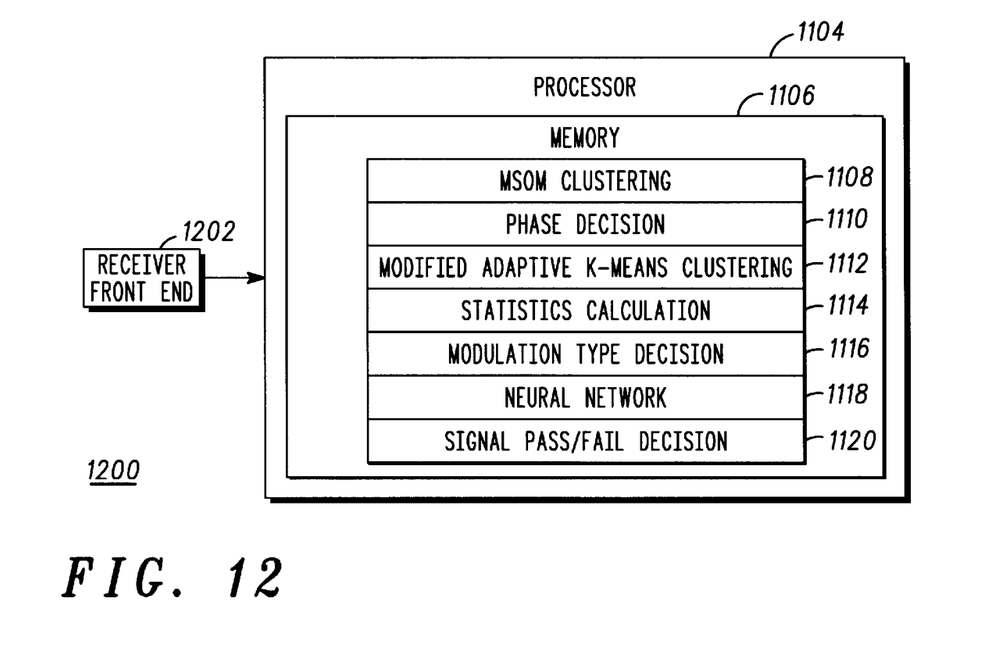
FIG. 12 is an electrical block diagram of an exemplary receiver for classifying a baseband signal in accordance with the present invention.

FIG. 12 is an electrical block diagram of an exemplary receiver 1200 for classifying a baseband signal in accordance with the present invention. The receiver 1200 is similar to the apparatus 1100, the essential difference being the replacement of the input interface 1102 by a conventional receiver front end 1202 for receiving a wireless signal to produce the baseband signal.

It should be clear from the preceding disclosure that the present invention provides a method and apparatus for classifying a received signal. The method and apparatus advantageously requires much less memory than prior-art techniques, and is highly resistant to falsing.

Many modifications and variations of the present invention are possible in light of the above teachings. For example, while the embodiments disclosed herein are for classifying 2-level and 4-level FSK signals, the present invention can be applied to many other types of modulation. Thus, it is to be understood that, within the scope of the appended claims, the invention can be practiced other than as specifically described herein above.

What is claimed is:

1. A method for classifying a baseband signal as one of (a) noise and (b) a predetermined type of data signal comprising a plurality of symbols, each symbol represented by one of a plurality of modulation levels, the method comprising the steps of:

receiving the baseband signal;

determining a maximum modulation level and a minimum modulation level in the baseband signal through a modified self-organizing map (MSOM) clustering technique;

initializing a plurality of clusters corresponding to the plurality of modulation levels, based upon said maximum and minimum modulation levels;

processing, through a modified adaptive k-means clustering technique, a symbol value corresponding to each of the plurality of symbols by updating parameters maintained for a cluster of the plurality of clusters, said cluster having a cluster mean value within a modulation-specified distance from the symbol value;

calculating a plurality of statistical values from the parameters maintained for the plurality of clusters; and classifying the baseband signal, based upon said plurality of statistical values and said parameters.

2. The method of claim 1, wherein the processing step comprises the steps of:

locating a maximum eye sample phase corresponding to a maximum eye opening in the baseband signal; and processing only the symbol value corresponding to the maximum eye sample phase.

3. The method of claim 1, wherein the determining step comprises the step of utilizing an asymmetric cluster radius to determine the maximum and minimum modulation levels.

4. The method of claim 1, wherein the processing step comprises the step of accumulating a sum of squares of input samples; and wherein the calculating step comprises the step of calculating from said sum a standard deviation of the input samples about the cluster mean value, said standard deviation providing a measure of signal quality.

5. The method of claim 1, wherein the processing step comprises the step of maintaining a count of transitions occurring among the plurality of clusters during a predetermined period, said count providing a measure of symbol rate.

6. The method of claim 1, wherein the classifying step comprises the step of classifying the baseband signal as passing or failing, based upon a symbol rate, a modulation type, and a signal quality, as determined from said plurality of statistical values and said parameters.

7. The method of claim 1, wherein the predetermined type of data signal can utilize during a first period a first modulation type having a first number of modulation levels and can utilize during a second period a second modulation type having a second number of modulation levels, the second number different from the first number, and wherein the determining, initializing, processing, calculating, and classifying steps are performed substantially in parallel for both the first and second modulation types.

8. The method of claim 7, wherein the calculating step comprises the step of calculating a first average of the cluster mean values for all clusters of the first modulation type, and calculating a second average of the cluster mean values for all clusters of the second modulation type, the first and second averages providing a measure of a frequency offset for the first and second modulation types, respectively.

9. The method of claim 7, wherein the calculating step comprises the step of calculating, for the clusters of the first modulation type, a first standard deviation of the clusters about the corresponding phase cluster mean, and calculating, for the clusters of the second modulation type, a second standard deviation of the clusters about the corresponding phase cluster mean, the first and second standard deviations providing a measure indicative of which one of the first and second modulation types is currently utilized.

10. The method of claim 7, wherein the calculating step comprises the step of calculating a first total number of samples in all clusters of the first modulation type, and calculating a second total number of samples in all clusters of the second modulation type, and utilizing the first and second total numbers of samples in a non-linear mapper to correct for a non-linearity of a measure of signal quality.

11. An apparatus for use in a receiver, the apparatus for classifying a baseband signal as one of (a) noise and (b) a predetermined type of data signal comprising a plurality of symbols, each symbol represented by one of a plurality of modulation levels, the apparatus comprising:

an input interface for receiving the baseband signal;

a processor coupled to the input interface for processing the baseband signal, wherein the processor is programmed to:

determine a maximum modulation level and a minimum modulation level in the baseband signal through a modified self-organizing map (MSOM) clustering technique;

initialize a plurality of clusters corresponding to the plurality of modulation levels, based upon said maximum and minimum modulation levels;

process, through a modified adaptive k-means clustering technique, a symbol value corresponding to each of the plurality of symbols by updating parameters maintained for a cluster of the plurality of clusters, said cluster having a cluster mean value within a modulation-specified distance from the symbol value;

calculate a plurality of statistical values from the parameters maintained for the plurality of clusters; and classify the baseband signal, based upon said plurality of statistical values and said parameters.

12. The apparatus of claim 11, wherein the processor is further programmed to:

locate a maximum eye sample phase corresponding to a maximum eye opening in the baseband signal; and process only the symbol value corresponding to the maximum eye sample phase.

13. The apparatus of claim 11, wherein the processor is further programmed to utilize an asymmetric cluster radius to determine the maximum and minimum modulation levels.

14. The apparatus of claim 11, wherein the processor is further programmed to:
   accumulate a sum of squares of input samples; and
   calculate from said sum a standard deviation of the input samples about the cluster mean value, said standard deviation providing a measure of signal quality.

15. The apparatus of claim 11, wherein the processor is further programmed to maintain a count of transitions occurring among the plurality of clusters during a predetermined period, said count providing a measure of symbol rate.

16. A receiver for classifying a baseband signal as one of (a) noise and (b) a predetermined type of data signal comprising a plurality of symbols, each symbol represented by one of a plurality of modulation levels, the receiver comprising:
   a receiver front end for receiving a wireless signal to produce the baseband signal;
   a processor coupled to the receiver front end for processing the baseband signal, wherein the processor is programmed to:
      determine a maximum modulation level and a minimum modulation level in the baseband signal through a modified self-organizing map (MSOM) clustering technique;
      initialize a plurality of clusters corresponding to the plurality of modulation levels, based upon said maximum and minimum modulation levels;
      process, through a modified adaptive k-means clustering technique, a symbol value corresponding to each of the plurality of symbols by updating parameters maintained for a cluster of the plurality of clusters, said cluster having a cluster mean value within a modulation-specified distance from the symbol value;
      calculate a plurality of statistical values from the parameters maintained for the plurality of clusters; and
      classify the baseband signal, based upon said plurality of statistical values and said parameters.

17. The receiver of claim 16, wherein the processor is further programmed to:
   locate a maximum eye sample phase corresponding to a maximum eye opening in the baseband signal; and
   process only the symbol value corresponding to the maximum eye sample phase.

18. The receiver of claim 16, wherein the processor is further programmed to utilize an asymmetric cluster radius to determine the maximum and minimum modulation levels.

19. The receiver of claim 16, wherein the processor is further programmed to:
   accumulate a sum of squares of input samples; and
   calculate from said sum a standard deviation of the input samples about the cluster mean value, said standard deviation providing a measure of signal quality.

20. The receiver of claim 11, wherein the processor is further programmed to maintain a count of transitions occurring among the plurality of clusters during a predetermined period, said count providing a measure of symbol rate.

* * * * *